United States Patent
Sargeant et al.

(10) Patent No.: US 6,652,961 B2
(45) Date of Patent: *Nov. 25, 2003

(54) INLINE COATED POLYESTER FILM WITH THERMALLY STABLE AND RELEASABLE COATING

(75) Inventors: Steven J. Sargeant, Kingston, RI (US); Yasushi Takada, Otsu (JP); Masaaki Sudo, Anpachi-gun (JP); John Fitch, Middletown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/289,578

(22) Filed: Nov. 7, 2002

(65) Prior Publication Data

US 2003/0099825 A1 May 29, 2003

Related U.S. Application Data

(63) Continuation-in-part of application No. 09/730,951, filed on Dec. 6, 2000, now Pat. No. 6,511,740.

(51) Int. Cl.[7] .................. B32B 27/08; B32B 27/30; B32B 27/36
(52) U.S. Cl. .............. 428/336; 428/480; 428/483; 428/910; 526/319; 526/326; 526/328.5; 526/329.1; 526/329.2; 526/329.7
(58) Field of Search ................ 428/336, 480, 428/483, 910; 526/319, 326, 328.5, 329.1, 329.2, 329.7

(56) References Cited

U.S. PATENT DOCUMENTS

| | | | |
|---|---|---|---|
| 4,603,079 A | 7/1986 | Nishizaki et al. | |
| 4,743,643 A | 5/1988 | Buter | |
| 4,857,574 A | 8/1989 | Buter | |
| 5,548,017 A | * 8/1996 | DiStefano | 524/514 |
| 5,624,076 A | 4/1997 | Miekka et al. | |
| 5,795,649 A | 8/1998 | Cosentino et al. | |
| 5,928,781 A | 7/1999 | Caines et al. | |
| 5,968,664 A | 10/1999 | Heberger et al. | |
| 6,398,999 B1 | * 6/2002 | Josephy et al. | 264/81 |
| 2002/0106505 A1 | * 8/2002 | Sargeant et al. | 428/336 |
| 2003/0077467 A1 | * 4/2003 | Fitch et al. | 428/480 |

FOREIGN PATENT DOCUMENTS

| | | |
|---|---|---|
| EP | 0 779 326 A1 | 6/1997 |
| EP | 0 916 703 A2 | 5/1999 |
| JP | 08-300545 | * 11/1996 |
| WO | WO 00/24946 | 5/2000 |

* cited by examiner

*Primary Examiner*—Vivian Chen
(74) *Attorney, Agent, or Firm*—Piper Rudnick LLP

(57) ABSTRACT

A biaxially oriented polyester film with a substantially non-crosslinked polymeric coating containing styrene and acrylate, wherein the coating is highly thermally stable with a primary onset temperature of greater than about 350C, having a glass transition temperature between about 0C and about 50C, having a solubility in a low molecular weight organic solvent, and having a surface energy of greater than about 35 dyne/cm and less than about 40 dyne/cm.

24 Claims, No Drawings

INLINE COATED POLYESTER FILM WITH THERMALLY STABLE AND RELEASABLE COATING

RELATED APPLICATION

This is a continuation-in-part of U.S. application Ser. No. 09/730,951 filed Dec. 6, 2000, U.S. Pat. No. 6,511,740.

FIELD OF THE INVENTION

This invention relates to biaxially oriented films, particularly to inline biaxially oriented polyester films having a thermally stable, releasable polymeric coating.

BACKGROUND

It is desirable to provide a coated polyester film for the production of optically variable pigments. The coating for use in this process is preferred to be processed inline to provide for the lowest cost of production. Furthermore, this coating should have the following unique and special attributes:

1) High thermal stability,
2) Very rapid dissolution into a recovery solvent such as acetone,
3) Water insolubility,
4) Tg>0C, Tg<50C as defined by the differential scanning calorimetery (DSC) method,
5) Highly extensible to survive an inline coating process, without turning hazy or white,
6) Substantially noncrosslinked,
7) Surface Energy <40 dyne/cm and >=35 dyne/cm.

Others have attempted to produce polyester films of the type described above, but have had limited success. For example, U.S. Pat. No. 5,968,664 discloses a polyester film with a releasable coating comprising copolymers of methylmethacrylate (MMA) and ethylacrylate (EA) and homopolymers of polyacrylic acid (AA), wherein the coating layers are soluble in the release solvent. However, no mention is made concerning the limitations of thermal stability, quantification of acetone solubility, metal release, surface energy and glass transition temperatures.

U.S. Pat. No. 5,795,649 discloses a polymeric coated film including water soluble copolymer of styrene (S) and an alpha, beta-unsaturated carboxylic acid or anhydride like maleic anhydride, wherein the molecular weight of the copolymer is from about 700 to 10,000. However, the molecular weight restriction limits the actual processability of the materials. Also, there is no mention of thermal stability, quantification of acetone solubility, metal release, surface energy and glass transition temperatures.

U.S. Pat. No. 5,928,781 discloses a method of making a thin layer or flakes of materials by using a coated substrate. The coating is defined as solvent soluble and containing a Crotonic acid polymer. Again, the important limitations of thermal stability, quantification of acetone solubility, metal release, surface energy and glass transition temperatures are not mentioned.

U.S. Pat. No. 6,013,370 discloses a method for making optically variable pigments by use of a sputtering process. The mode of cracking of the flake is indicated as being a key to the process. It discloses that the coating assists in producing flake of high aspect ratio, and mentions it as desirable.

SUMMARY OF THE INVENTION

This invention relates to a biaxially oriented polyester film having a substantially non-crosslinked polymeric coating containing styrene and acrylate, wherein the coating is highly thermally stable with a primary onset temperature of greater than about 350° C., having a glass transition temperature between about 0° C. and about 50° C., having a solubility in a low molecular weight organic solvent, and having a surface energy of greater than about 35 dyne/cm and less than about 40 dyne/cm.

DETAILED DESCRIPTION

Thermal stability in accordance with this invention is defined herein as the temperature at which a 10% weight loss occurs of the primary decomposition curve for the polymeric coating materials. In determining thermal stability, the coating material is heated in a nitrogen atmosphere from ambient to 105° C. at 10° C./min. The sample is then held at 105° C. for 15 minutes then ramped to 550° C. at 10° C. per minute. The temperature corresponding to 10% weight loss is read from the weight loss curve.

Solubility was measured by immersing the coated film into a bath of acetone for approximately 2 seconds. The films were then removed and allowed to air dry. The films were then inspected with a light microscope at 40×magnification and grouped by percentage of coating removal. Thus, rapid solubility is defined when at least about 75% of the coating is removed by a low mol weight solvent, preferably acetone.

Surface energy is defined from measurements of the contact angle of water on the surface of the coated PET base film. The surface energy numbers reported here are derived from conversion of the contact angle of water on the surface to absolute wetting tension values.

Glass transition temperatures (Tg) are reported from manufacturers literature. They are obtained by making measurements by use of the well-known DSC method. Glass transition temperatures were measured by the manufacturers of the polymer emulsions via the use of differential scanning calorimetery (DSC). DSC is a well-known method in the art to characterize thermal phase transitions of polymeric materials; please see Allcock, H. R., Camp, J. W. "Contemporary Polymer Chemistry", Prentice-Hall 1990, Chapter 17, which describes DSC as the Industry Standard technique for measuring Tg values.

Metal release is measured from bell jar metallizing the coated PET or related polymeric samples with aluminum metal to an OD of about 2.5. The metallized samples are then submersed in acetone for approximately 2 seconds, removed, and then brushed gently with a dry cloth. A metal release value of Excellent means that essentially all aluminum was released when using this technique. A metal release rating of fair means that approximately 25–50% of the metal was released via this technique. A metal release value of poor means that less than approximately 25% was released by this technique.

Crosslinking is the process whereby adjacent polymer chains are covalently linked, ultimately increasing the molecular weight of the polymer materials. If sufficiently high crosslinking density is achieved, the bulk material can be considered a single molecule in that the individual polymer molecules have been linked through one or more covalent linkage points with another polymer chain. During increasing crosslinking density of the material, changes to the melt flow, Tg, decomposition temperature, solubility in various solvents and other physical and chemical changes to the polymer develop. However, at low, or as often defined in the art, "light", crosslinking density, the polymer material acts essentially or substantially as a non-crosslinked material. Changes that significantly or materially impact the chemical or physical attributes of the polymeric material are, therefore, defined as significant or substantial crosslinking and are undesirable in the context of the invention. The degree of crosslinking of the coating should preferably be kept below about 1% by weight, based on the weight of the polymer. Crosslinking in an amount less than about 1% by weight is clearly substantially non-crosslinked.

Although not wishing to be bound by any particular theory, we believe the following description of the physical process employed is helpful in illustrating the invention.

In the vacuum sputtering process of polyester film (PET), an organic surface (the PET film) is in contact with a hot metal gas (the sputerant). The temperature of this gas may approach 1000C. When the hot metal gas contacts the organic coating, decomposition of the underlying substrate often occurs. This decomposition may result in crosslinking of the coating, shrinkage of the coating or off gassing of decomposed adducts. Crosslinking of the coating will render it insoluble and, thus, unable to release the inorganic pigment. Thermal shrinkage or off gassing of decomposition adducts degrades the metal layer through increased cracking and pitting of the metal layer. Therefore, it is desired to construct a coating surface having high thermal stability to resist the effects of high thermal loads from the sputtering process.

Concurrently, metal having a high surface energy has stronger adhesion to surfaces having high surface energy. An increase in metal/coating adhesion forces increases the time required to release the sputter coated metal from the surface of the coated PET. Therefore, we have found that for best processing of the metallized films, that a surface energy SE between about 35 dyne/cm and about 40 dyne/cm is preferred.

EXAMPLES

Example 1

A coating solution of Akzo Nobel Resins(1) 33–3372, a high molecular weight copolymer of styrene and methyl methacrylate was prepared as follows:

| Resin | 12 parts |
|---|---|
| Distilled Water | 100 parts |
| Fluorosurfactant (2) (1% Solution) | 0.25 parts |

(2) Zoynl FSO, Dupont Company, Wilmington, DE 19880.

(1) Akzo Nobel, 2904 Missouri Avenue, E. St. Louis, Ill. 62205

The Akzo 33–3372 material (Example 1) has recently been described as a possible range of:

| Styrene | 5–60% |
|---|---|
| MMA | 1–25% |
| Butylmethylacrylate | 20–70% |
| 2-ethyl-hexylacrylate | 1–25% |
| Acrylic Acid | 1–10% |
| Methacrylic Acid | 1–10% |

The base film was prepared from dried PET pellets with 0.015% by weight of 0.4 um silica and 0.005% by weight of 1.4 um silica as fillers. This material was extruded onto a casting drum maintained at 25C, and pinned down to the drum via electrostatic force. The base film was oriented in the machine direction (MD direction) at a 3.3 draw ratio. The coating was applied with a #6 Meyer rod. The film was then heated and stretched in the transverse direction (TD direction) at a 3.3 draw ratio. Within the TD direction stretcher, referred to as a stenter, the coated film was exposed to three separate heating zones at 85C, 100C and 225C respectively. The resultant clear films were wound for further evaluation.

Example 2

A coating solution of Lucidene 243(3), a high molecular weight copolymer of styrene, α-methyl styrene and methylmethacrylate and $NH_4$-acrylic acid was prepared as follows:

| Resin | 10 parts |
|---|---|
| Distilled Water | 100 parts |
| Fluorosurfactant (1% Solution) | 0.25 parts |

(3) Rohm and Haas, 100 N. Riverside Plaza, Chicago, Ill 60606.

The base film was prepared from dried PET pellets with 0.015% by weight of 0.4 um silica and 0.005% by weight of 1.4 um silica as fillers. This material was extruded onto a casting drum maintained at 25° C., pinned down to the drum via electrostatic force. The base film was oriented in the MD direction at a 3.3 draw ratio. The coating was applied with a #6 Meyer rod. The film was then heated and stretched in the TD direction at a 3.3 draw ratio. Within the TD direction stretcher, the coated film was exposed to three separate heating zones at 85C, 100C and 225C, respectively. The resultant clear films were wound for further evaluation.

Example 3

A coating solution of Nacrylic 68–2500(4), a high molecular weight copolymer of styrene and methylmethacrylate, was prepared as follows:

| Resin | 10 parts |
|---|---|
| Distilled Water | 100 parts |
| Fluorosurfactant (1% Solution) | 0.25 parts |

(4) Nacan Chemicals, Montreal, Canada.

Comparative Example 1

A coating solution of Hycar 26315 (5), a high molecular weight copolymer of styrene, ethylacrylate, acrylonitrile and methoylacrylamide was prepared as follows:

| Resin | 10 parts |
|---|---|
| Distilled Water | 100 parts |
| Fluorosurfactant (1% Solution) | 0.25 parts |

(5) B.F. Goodrich Corporation, 9911 Brecksville Rd., Cleveland, Ohio 44141.

The base film was prepared from dried PET pellets with 0.015% by weight of 0.4 um silica and 0.005% by weight of 1.4 um silica as fillers. This material was extruded onto a casting drum maintained at 25C, pinned down to the drum via electrostatic force. The base film was oriented in the MD direction at a 3.3 draw ratio. The coating was applied with a #6 Meyer rod. The film was then heated and stretched in the TD direction at a 3.3 draw ratio. Within the TD direction stretcher, the coated film was exposed to three separate heating zones at 85C, 100C and 225C, respectively. The resultant clear films were wound for further evaluation.

Comparative Example 2

A coating solution of Rhoplex HA-16 (6), a high molecular weight copolymer of Styrene, Acrylic Acid and Methylmethacrylate:

| Resin | 10 parts |
|---|---|
| Distilled Water | 100 parts |
| Fluorosurfactant (1% Solution) | 0.25 parts |

(6) Rohm & Haas 1500 Lathem St., Batavia Ill. 60510.

The base film was prepared from dried PET pellets with 0.015% by weight of 0.4 um silica and 0.005% by weight of 1.4 um silica as fillers. This material was extruded onto a casting drum maintained at 25C, pinned down to the drum via electrostatic force. The base film was oriented in the MD direction at a 3.3 draw ratio. The coating was applied with a #6 Meyer rod. The film was then heated and stretched in the TD direction at a 3.3 draw ratio. Within the TD direction stretcher, the coated film was exposed to three separate heating zones at 85C, 100C and 225C, respectively. The resultant clear films were wound for further evaluation.

Although the Examples indicate the coatings were applied by a Meyer rod, any well-known and effective doctoring method known in the art, and any suitable coating method may be used in the application of the coating materials. Examples of other suitable coating methods include gravure coating, reverse roll coating, extrusion die coating, knife over roll coating, kiss coating with air knife doctoring, and others.

In the Examples, specific information about the base film is given. However, we consider that many modifications to the base film are possible without changing the beneficial properties of the coated film in a significant way. Examples well known in the art to change the base film properties include changing the type, size and content of its filler materials. Filler materials are required in the production of clear sheet plastics to prevent blocking of the film. Therefore, many changes are possible in the content of the fillers without affecting the properties of the coated film in a material way. Additionally, besides PET film, the release properties of the coating described in this invention disclosure can be achieved by the use of PBT film (polybutyleneterephthlate) and PEN film (such as polyethylene-2,6-naphthylate) instead of PET, and other copolyester films having an intrinsic viscosity of about 0.65 more or less.

Regarding extensibility in accordance with this invention, we have indicated methods used to determine metal release and acetone solubility. Extensibility of the coating is difficult to define exactly. However, if the coating utilized is not extensible then it will not survive the stretching process used to produce bi-axially oriented PET. We know the coatings are not extensible when they turn hazy or white when they are coated, dried and then stretched in the film making process. For the materials used in the examples and comparative examples all survived the stretching process. However, it is not uncommon for materials to fail this process.

Regarding solvents, acetone is the preferred solvent. Methylethylketone (MEK), toluene and the like are also useful in accordance with this invention.

Regarding freedom from crosslinking, we believe it is preferable to minimize the degree of crosslinking of the polymeric coating to less than about 1% by weight, based upon the total weight of the polymer.

Various coatings may be used, including but not limited to water insoluble emulsions. The coating may include styrene and acrylate, preferably styrene/methyl-methacrylate copolymer or various terpolymers. Other monomers may be used as well. Various styrenes may be used, preferably styrene and/or a-methyl styrene. Accordingly, styrene refers to styrene and variations thereof so long as the resulting polymeric coating has the preferred Tg, SE, onset and solubility characteristics. Also, various methyl acrylates may be used, preferably methylmethacrylate. Accordingly, acrylate refers to any of the acrylates so long as the resulting polymeric coating has the preferred Tg, SE, onset and solubility characteristics.

A summary of thermal stability, acetone solubility, surface energy (SE) and metal release for materials in the Examples is contained in Table 1.

TABLE 1

| Material | Tg C | SE of Film Dyne/cm | Onset C | Rapid Acetone Solubility | Metal Release |
|---|---|---|---|---|---|
| Example 1 | 44 | 35 | 380 | Yes | Excellent |
| Example 2 | 7 | 38 | 360 | Yes | Excellent |
| Example 3 | 25 | 39 | 380 | Yes | Good |
| Comparative Example 1 | 55 | 37 | 390 | No | Fair |
| Comparative Example 2 | 55 | 43 | 380 | No | Poor |

What is claimed is:

1. A biaxially oriented polyester film having a substantially non-crosslinked polymeric coating comprising styrene and acrylate, wherein said coating is highly thermally stable with a primary onset temperature of greater than about 350C, having a glass transition temperature between about 0C and about 50C, having a solubility in a low molecular weight organic solvent, and having a surface energy between about 35 dyne/cm and about 40 dyne/cm.

2. The film defined in claim 1, wherein said polyester film is polyethylene terephthalate.

3. The film defined in claim 1, wherein said polyester film is polybutylene terephthalate.

4. The film defined in claim 1, wherein said polyester film is polyethylene naphthalate.

5. The film defined in claim 1, wherein the polyester film has an intrinsic viscosity of approximately 0.65.

6. The film defined in claim 1, wherein said polymeric coating comprises less than about 1% by weight of crosslinked polymer.

7. The film defined in claim 1, wherein said polymeric coating has a thickness of about 0.08 μm.

8. The film defined in claim 1, wherein said polymeric coating is a water soluble emulsion.

9. The film defined in claim 1, wherein said polymeric coating is a styrene/methylmethacrylate copolymer.

10. The film defined in claim 1, wherein said polymeric coating contains terpolymers.

11. The film defined in claim 1, wherein said polymeric coating contains monomers.

12. The film defined in claim 1, wherein the solubility is sufficiently high to remove at least about 75% of the polymeric coating when dissolved in the low molecular weight solvent.

13. The film defined in claim 1, wherein the solvent is selected from the group consisting of acetone, methylethylketone and toluene.

14. The film defined in claim 1, wherein the polymeric coating is non-crosslinked.

15. A biaxially oriented polyester film having a substantially non-crosslinked polymeric coating consisting essentially of a styrene/acrylate copolymer emulsion, wherein:

said coating is highly thermally stable with a primary onset temperature of greater than about 350C, having a glass transition temperature between about 0C and about 50C, having a rapid solubility in a low molecular weight organic solvent, and having a surface energy of greater than about 35 dyne/cm and less than about 40 dyne/cm.

16. The film defined in claim 15, wherein said polyester film is polyethylene terephthalate.

17. The film defined in claim 15, wherein said polyester film is polybutylene terephthalate.

18. The film defined in claim 15, wherein said polyester film is polyethylene-2,6-naphthalate.

19. The film defined in claim 15, wherein said polymeric coating comprises less than about 1% by weight of crosslinked polymer.

20. The film defined in claim 15, wherein said polymeric coating has a thickness of about 0.08 $\mu$m.

21. The film defined in claim 15, wherein said polymeric coating is a water soluble emulsion.

22. The film defined in claim 15, wherein said polymeric coating is a styrene/methylmethacrylate copolymer.

23. The film defined in claim 15, wherein said polymeric coating contains terpolymers.

24. The film defined in claim 15, wherein said polymeric coating contains monomers.

* * * * *